Jan. 5, 1943.　　　　G. A. BESS　　　　2,307,381
HELICOPTER PROPELLER
Filed July 12, 1940
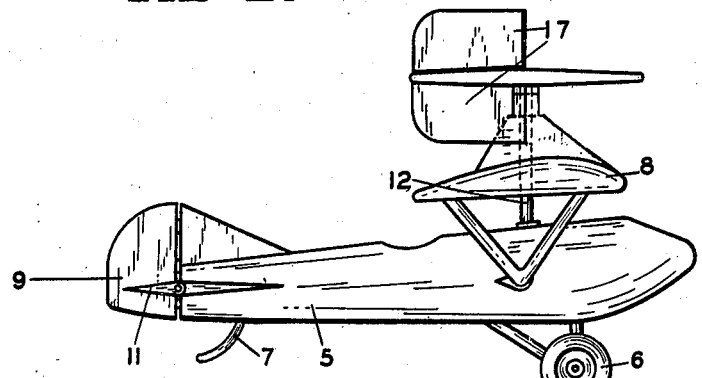
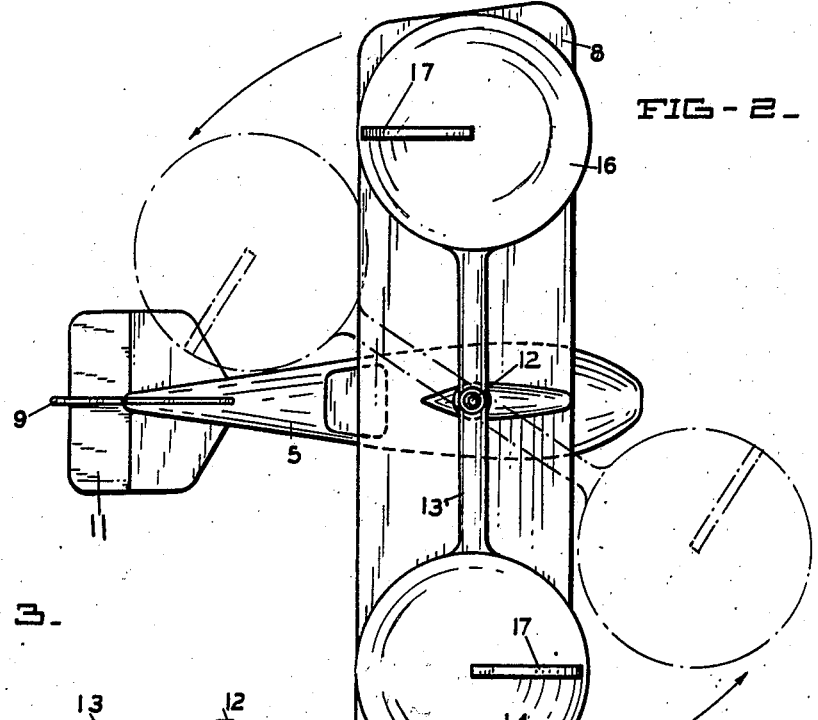
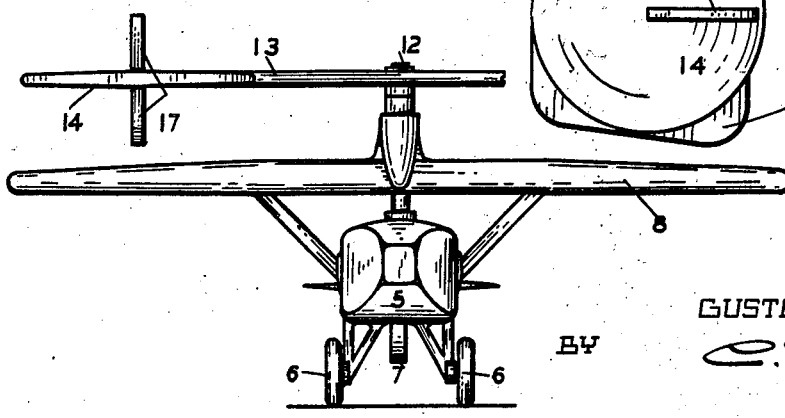
INVENTOR
GUSTAVUS A. BESS.
BY
ATTORNEY.

Patented Jan. 5, 1943

2,307,381

UNITED STATES PATENT OFFICE 2,307,381

HELICOPTER PROPELLER

Gustavus A. Bess, Sacramento, Calif.

Application July 12, 1940, Serial No. 345,021

1 Claim. (Cl. 170—167)

This invention relates to improvements in airplanes of the helicopter type.

The principal object of this invention is to produce an airplane helicopter propeller which will be efficient in operation and one wherein the air currents will be prevented from spilling from the propeller supporting surfaces.

A further object is to provide means whereby the air being acted upon by the propeller will be condensed so as to cause a greater working efficiency.

A further object is to produce a device of this character which may be attached to any standard airplane fuselage and operated by the motor positioned therein.

A further object of the invention is to produce a device of this character which is economical to manufacture and sturdy in construction.

A still further object of the invention is to produce a propeller which will enable the airplane having the same thereon to take off and land within a very limited area in counterdistinction to the ordinary airplane, which requires a long runway.

Other objects and advantages will be apparent during the course of the following description.

In the accompanying drawing forming a part of this specification and in which like numerals are employed to designate like parts throughout the same, Fig. 1 is a side elevation of an airplane equipped with my propeller;

Fig. 2 is a top plan view of Fig. 1; and

Fig. 3 is a front elevation of Fig. 1 having a portion of the propeller broken away.

The ordinary airplane has a propeller either of the pusher or the puller type which when revolved rapidly causes the airplane to travel over the ground until sufficient speed has been gained where the air beneath the wing surfaces will be sufficient to support the airplane. When an airplane of this type is heavily loaded, it often requires a considerable distance before flight is possible.

With my improved helicopter arrangement, by merely rotating the propeller mounted above the wing surface, the propeller is enabled to act upon sufficient wind to cause an uplift which will support the vehicle in flight. It is, of course, obvious that forward motion may be obtained by a slight tipping of the propeller forwardly or backwardly, but as that is common to helicopters, the same has been eliminated from the drawing for simplicity's sake.

The same mechanism shown in my previous Patent No. 1,744,257, may be used for driving the propeller, or any similar mechanism may be employed.

In the accompanying drawing wherein for the purpose of illustration is shown a preferred embodiment of my invention, the numeral 5 designates the body of an airplane having the customary wheels 6 and skid 7. At 8 I have shown a wing surface, which wing surface may be of any desired design, and the usual rudder is shown at 9, with an elevating rudder being shown at 11. The parts thus far described are common to any airplane and form no part of my invention.

My invention consists of a propeller mounted upon a shaft 12 about the axis of which the same is rotated through power delivered to the shaft in any convenient manner. A strut 13 is keyed or otherwise secured to the shaft 12 and extends substantially parallel to the top of the wing 8 (see Fig. 3). At the outer end of this strut 13 I provide discs 14 and 16, which discs are substantially the same width as the width of the wing surface. Extending above and below each disc are vertically arranged blades 17.

The result of this construction is that when the propeller is mounted on the top of the airplane (as shown) and the same is revolved, a lifting action will take place, as is common with helicopter propellers. The ordinary helicopter propeller, however, is very inefficient in that the air spills off the outer ends of the propeller, and, also, the rotating of the propeller has a tendency to push away some of the air adjacent the leading edge. I have, therefore, provided vertically disposed blades above and below the disc portion of the propeller, which blades in rotating tend to prevent the air from spilling off the propeller; and, at the same time, as the propeller rotates, these blades gather in additional air adjacent the leading edge and, thus, in a sense, compress the air so that the propeller has more surface upon which to act.

It will thus be seen that my propeller accomplishes all the objects herein set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a helicopter propeller, a strut secured to and rotated by a shaft and in a horizontal plane, discs secured to the outer ends of said strut, said discs being substantially flat, and means carried by said discs for preventing the spilling of air from said propeller when said propeller is rotated, said means including vertically disposed blades arranged on the upper and lower surfaces of said discs, said blades being in vertical alignment one with the other and positioned toward the leading edge of said discs.

GUSTAVUS A. BESS.